United States Patent
Meer

(10) Patent No.: US 10,150,277 B2
(45) Date of Patent: Dec. 11, 2018

(54) CONNECTION ELEMENT, CONNECTION ARRANGEMENT, METHOD FOR PRODUCING A CONNECTION ELEMENT AND METHOD FOR PRODUCING A CONNECTION ARRANGEMENT

(71) Applicant: AIRBUS DEFENCE AND SPACE GMBH, Taufkirchen (DE)

(72) Inventor: Thomas Meer, Glonn (DE)

(73) Assignee: Airbus Defence and Space GmbH, Taufkirchen (DE)

(*) Notice: Subject to any disclaimer, the term of this patent is extended or adjusted under 35 U.S.C. 154(b) by 54 days.

(21) Appl. No.: 15/371,890

(22) Filed: Dec. 7, 2016

(65) Prior Publication Data
US 2017/0157908 A1 Jun. 8, 2017

(30) Foreign Application Priority Data
Dec. 8, 2015 (DE) .......... 10 2015 224 613

(51) Int. Cl.
*B29C 65/08* (2006.01)
*B32B 37/04* (2006.01)
*B32B 7/10* (2006.01)
*B32B 27/08* (2006.01)
*B32B 27/38* (2006.01)
*B29C 65/06* (2006.01)
*B32B 27/28* (2006.01)
*B32B 27/36* (2006.01)

(52) U.S. Cl.
CPC .......... *B32B 37/04* (2013.01); *B29C 65/0627* (2013.01); *B29C 65/0672* (2013.01); *B29C 65/08* (2013.01); *B32B 7/10* (2013.01); *B32B 27/08* (2013.01); *B32B 27/28* (2013.01); *B32B 27/281* (2013.01); *B32B 27/285* (2013.01); *B32B 27/286* (2013.01); *B32B 27/365* (2013.01); *B32B 27/38* (2013.01); *B32B 2250/02* (2013.01); *B32B 2250/03* (2013.01); *B32B 2250/24* (2013.01); *B32B 2262/106* (2013.01); *B32B 2270/00* (2013.01); *B32B 2307/308* (2013.01); *B32B 2310/027* (2013.01)

(58) Field of Classification Search
USPC .......................................... 428/413
See application file for complete search history.

(56) References Cited

U.S. PATENT DOCUMENTS

| | | | |
|---|---|---|---|
| 5,667,881 A | 9/1997 | Rasmussen et al. | |
| 2009/0246548 A1 | 10/2009 | Hou et al. | |
| 2012/0298652 A1* | 11/2012 | Winter ........... | B64D 15/12 219/538 |

FOREIGN PATENT DOCUMENTS

WO  WO 2007/109 855 A1  10/2007
WO  WO 2012/161 569 A1  11/2012

OTHER PUBLICATIONS

German Office Action for Application No. 10 2015 224 613 dated Aug. 5, 2016.

* cited by examiner

*Primary Examiner* — Terressa Boykin
(74) *Attorney, Agent, or Firm* — Jenkins, Wilson, Taylor & Hunt, P.A.

(57) ABSTRACT

A connection element includes a composite component with a cured epoxy resin, a first layer including a first thermoplastic polymer and an intermediate layer arranged between the composite component and the first layer, the first layer containing both the cured epoxy resin of the composite component and the first thermoplastic polymer of the first layer. The first thermoplastic polymer has a melting point above a curing temperature of the epoxy resin and is soluble at a temperature of at least 150° C. in the epoxy resin used for producing the composite component.

34 Claims, 10 Drawing Sheets

ONNECTION ELEMENT, CONNECTION
ARRANGEMENT, METHOD FOR
PRODUCING A CONNECTION ELEMENT
AND METHOD FOR PRODUCING A
CONNECTION ARRANGEMENT

CROSS-REFERENCE TO RELATED
APPLICATION

This application claims priority to German Patent Application No. DE 10 2015 224 613.2 filed Dec. 8, 2015, the entire disclosure of which is incorporated by reference herein.

TECHNICAL FIELD

The present disclosure relates to a connection element, to a connection arrangement, to a method for producing a connection element and to a method for producing a connection arrangement.

BACKGROUND

Although applicable to any composite component comprising an epoxy resin, the present disclosure and the problems on which it is based are described in greater detail in relation to carbon-fiber-reinforced plastics materials (CFRPs).

In CFRPs, attachment points to other components have thus far generally been implemented by gluing, in other words on the basis of adhesion.

Other approaches for attaching attachment parts to an epoxy matrix which are already to be taken into account in producing a component are based on applying a thermoplastic layer by material connection of thermoplastic material to the matrix material, in particular during curing of the matrix material.

An approach of this type is described in US 2009/0246548 A1, according to which a semi-crystalline thermoplastic polymer is applied to an uncured thermosetting polymer, the curing temperature of which is above the melting point of the semi-crystalline thermoplastic polymer. Upon heating to the curing temperature of thermosetting polymer, thermoplastic polymer and thermosetting polymer intermix before thermosetting polymer cures. After cooling, a component having a suitable thermoplastic surface can subsequently be welded on in the region of thermoplastic polymer.

SUMMARY

One of the ideas of the present disclosure to provide an improved connection element and an improved connection arrangement.

According to an aspect a connection element is provided, comprising: a composite component comprising a cured epoxy resin; a first layer comprising a first thermoplastic polymer; an intermediate layer arranged between the composite component and the first layer and containing both the cured epoxy resin of the composite component and the first thermoplastic polymer of the first layer; wherein the first thermoplastic polymer has a melting point, in particular glass transition temperature, above a curing temperature of the epoxy resin; and wherein the first thermoplastic polymer is soluble at a temperature of at least 150° C. in the epoxy resin used for producing the composite component.

According to an aspect, a connection arrangement is provided, comprising: a connection element according to the disclosure herein; and a component connected to the connection element, wherein the component is welded to the first and/or a second layer of the connection element by welding, in particular by friction welding, for example by circular vibration friction welding.

According to an aspect a method for manufacturing a connection element, in particular a connection element according to the disclosure herein, is provided, the method comprising the following method steps:
i) providing a raw composite component comprising at least one uncured epoxy resin;
ii) applying a first layer comprising a first thermoplastic polymer to the raw composite component, the first thermoplastic polymer having a melting point, in particular glass transition temperature, above a curing temperature of the epoxy resin; and
iii) curing the raw composite component at a temperature of at least 150° C., the first thermoplastic polymer dissolving at a temperature of at least 150° C. in the at least one uncured epoxy resin.

According to an aspect a method for producing a connection arrangement, in particular a connection arrangement according to the disclosure herein, is provided, the method comprising the following method steps: providing a connection element according to the disclosure herein and/or a connection element produced by a method according to the disclosure herein; welding a component to be connected to the connection element to the first and/or second layer of the connection element by friction welding.

The idea behind the present disclosure is to dissolve a thermoplastic polymer at least in part in an uncured epoxy resin used to produce the composite component during the production of a connection element, in particular in a contact region with the uncured epoxy resin, which may for example have a contact thickness with the epoxy resin into thermoplastic polymer in a range of from 5 µm to 100 µm, for example 10 µm to 80 µm, a melting point, in particular glass transition temperature, of thermoplastic polymer being above the curing temperature of the epoxy resin. In this context, partial dissolution may be brought about for example by initially dissolving thermoplastic polymer in the contact region with the uncured epoxy resin by increasing the temperature and subsequently, before thermoplastic polymer dissolves completely in the epoxy resin, increasing the temperature to a temperature of the curing temperature of the epoxy resin or higher, so as to cure the epoxy resin. In this context, as well as the timings of the temperature increase, for example the epoxy resin used and/or thermoplastic polymer used may have an effect on the dissolution of thermoplastic polymer in the uncured epoxy resin. In addition, the amount of epoxy resin and/or thermoplastic polymer may also have an effect, and alternatively or in addition measures may also be taken to prevent complete dissolution of thermoplastic polymer, such as cooling the side of thermoplastic polymer remote from the epoxy resin to a temperature at which it does not dissolve in the epoxy resin. The corresponding heating temperatures and/or times may be set appropriately, for example as a function of the epoxy resin and/or thermoplastic polymer used.

In this context, the melting point may be determined appropriately, for example calorimetrically, for example by differential scanning calorimetry (DSC). Likewise, the glass transition temperature can be determined appropriately, for example by dynamic differential calorimetry.

Thermoplastic polymer is in particular a high-temperature thermoplastic or high-performance thermoplastic. For example, the glass transition temperature or at least a melting point of thermoplastic polymer is above the maximum temperature of use (degradation temperature) of the epoxy resin in the cured state. In particular by using a thermoplastic polymer having a glass transition temperature, in particular a first glass transition temperature for polymers having a plurality of glass transition temperatures, the epoxy resin can be appropriately attached to thermoplastic polymer.

The finding behind the disclosure herein is that at temperatures of 150° C. and higher a dissolution process of a thermoplastic polymer, in particular high-temperature thermoplastic, in the epoxy resin takes place, thermoplastic polymer dissolving in the uncured epoxy resin before and/or during the curing thereof. As a result of diffusion, this produces an intermediate layer, in particular of a finite thickness, which contains both thermoplastic polymer and the epoxy resin.

In particular, the dissolved first thermoplastic polymer precipitates out again during curing of the epoxy resin, resulting in a structural connection between the precipitated thermoplastic polymer and the cured epoxy resin. Thus, as the epoxy resin cures, a solid intermediate layer is produced, which may also be referred to as an interphase or mixed layer and has a thickness greater than zero.

After curing, thermoplastic polymer and the cured epoxy resin form a composite, in particular a solid and structurally stable composite, in the intermediate layer. Advantageously, the intermediate layer therefore has a high mechanical load-bearing capacity. The mechanical load-bearing capacity is not only due to adhesion effects. Rather, the structural composite is advantageously created by thermoplastic polymer and the cured epoxy resin engaging in one another, in particular in the form of physical cross-linking or a material connection.

Further, the connection of thermoplastic polymer to the cured epoxy resin advantageously creates a weldable portion of the connection element.

A typical curing temperature of the uncured epoxy resin is for example up to 200° C., in some embodiments up to 190° C., in particular up to 180° C. Within a process temperature window of for example at least 100° C., in some embodiments at least 120° C., in particular at least 150° C. and at most 200° C., in some embodiments at most 190° C., in particular at most 180° C., the first thermoplastic polymer thus dissolves in the epoxy resin, whilst the epoxy resin slowly cures. Because the melting point, in particular the glass transition, of thermoplastic polymer is above the curing temperature of the epoxy resin, this in particular does not lead to thermoplastic polymer melting. Instead, it is predominantly a dissolution process that is involved.

To produce the connection element, the first layer, for example in the form of a thermoplastic film, is applied, before the curing, to the raw composite component, which comprises the epoxy resin in an uncured state.

The first layer comprises at least the first thermoplastic polymer. Further substances, for example further polymers, in particular further thermoplastic polymers, may also be contained in the first layer. However, it is also possible for the first layer to comprise or consist entirely of the first polymer, aside from any impurities present for technical reasons.

The composite component comprises at least one cured epoxy resin. Further substances such as further epoxy resins may also be contained. The composite component should be understood to be a component which may contain further materials in addition to the epoxy resin or is connected to further materials via the epoxy resin. In particular, in some embodiments the composite component contains fibers, for example carbon fibers, basalt fibers or glass fibers, in particular carbon fibers.

To produce a connection arrangement comprising a component to be connected to the connection element, the element is welded to thermoplastic layer by friction welding. In particular vibration friction welding, for example circular vibration friction welding, is used for this purpose.

A particular effect of using a welding method of this type on the connection element according to the disclosure herein is that energy is thus introduced to the connection element exclusively at the (first and/or second) thermoplastic layer to be welded. There is therefore no direct energy input into the composite component. The composite component is merely heated to a reduced extent by introduction of heat from thermoplastic layer into the composite component. This provides that the melting point of the first thermoplastic polymer which is advantageous for the welding, and which is for example above the maximum temperature of use of the epoxy resin, is reached at the first layer. However, in particular as a result of thermal conduction from the first layer into the composite component in the region of the composite component, a maximum temperature of use of the cured epoxy resin is not reached or exceeded, or only to a non-harmful extent. Exceeding to a non-harmful extent involves exceeding within a narrow temperature range and/or exceeding for a very short duration, the harmfulness also potentially depending on the combined effect of the duration and the temperature range.

Thus, complete or continuous welding can be created without damaging or weakening the epoxy resin as a result of excessive heat input. Therefore, a welded connection is created which is suitable for the particular structures of the connection element in terms of the production process and material properties and which can thus in particular be made continuous.

Thus, according to the disclosure herein, a connection arrangement is created which maintains the strength properties of the epoxy resins or composite component over the entire temperature range of use thereof. Thus, advantageously, it is still basically the composite component and the epoxy resin thereof, and not thermoplastic polymer, which determine the temperature-dependent load-bearing capacity of the connection arrangement. By comparison with the pure composite component, the range of use of the composite component therefore remains advantageous, in particular comprehensive.

The friction-welded connection of the connection arrangement recognisable from the outside as a result of the friction weld flash which typically occurs during friction welding. The friction weld flash additionally brings technological advantageous. First, impurities are also expelled together with the friction weld flash. It is therefore not necessary to clean the surfaces of thermoplastic (first) layer and the component to be connected in advance. Further, as a result of the friction weld flash, any bumps in the surfaces to be welded are levelled out, ensuring a continuous welded connection. Thermoplastic (first) layer therefore has a thickness which makes possible removal of the friction weld flash required for welding, which contains thermoplastic material at least in part.

The connection arrangement according to the disclosure herein and the method according to the disclosure herein for producing a connection arrangement therefore have a plurality of advantages over adhesive connections, which are otherwise conventional for connection arrangements comprising composite components. For example, according to the disclosure herein, the manufacturing times can be shortened greatly by comparison with adhesive processes. Adhesive processes suitable for attachment to composite components generally take eight to twelve hours as a result of the necessary curing times. The friction welding according to the disclosure herein takes for example only 10 seconds.

In addition, robot-assisted assembly is made possible, ensuring particularly precisely positioned assembly. Further, relevant glues also have a considerable fall-off in strength at temperatures above 100° C. in warm and humid conditions, which is avoided in the welded connection according to the disclosure herein comprising high-temperature thermoplastics.

Advantageous embodiments of and improvements on the disclosure herein may be found in the dependent claims.

In some embodiments of a connection element, the first layer is provided externally on the composite component. Thus, a further component can be welded onto the first layer, which comprises the first thermoplastic polymer, externally.

In an embodiment, the first layer comprises or consists of the first thermoplastic polymer. This is thus advantageously reliably soluble in the epoxy resin and weldable after curing.

In an embodiment, thermoplastic polymer has a melting point, in particular a glass transition temperature, higher than 185° C. In particular, the melting point, in particular glass transition temperature, is higher than 200° C. Advantageously, the glass transition temperature of thermoplastic polymer is thus above the curing temperature and also above the temperatures of use of the epoxy resin which are possible for a relatively long time. Thus, the range of use of the connection element is advantageously not limited by comparison with the composite component. Thus, in particular, a melting point of the first polymer is thus above a temperature of use of the epoxy resin which is the maximum possible for a short time.

In an advantageous embodiment, the first thermoplastic polymer is selected from at least one from a group consisting of polyetherimide, polysulphone, polyphenylsulphone, polyhydroxyether (for example phenoxy) and polycarbonate. For these materials, in particular a suitable mechanical stability of the intermediate layer, in particular a high interlaminar energy release rate, can be achieved. For example, the quality of the connection, expressed in "G1c" values for composite materials, can be tested using a measurement of the mode 1 interlaminar energy release rate. Using these polymers, good compatibility with the epoxy resin of the composite component can also be provided.

Particularly, polyhydroxyether and/or polyetherimide (PEI) is used as the first thermoplastic polymer, in particular polyetherimide. In this way, on the one hand the highest energy release rates can be achieved during the G1c test, indicating a high mechanical load-bearing capacity and quality of the connection of the composite component to the first layer by way of the intermediate layer. On the other hand, polyetherimides can also have an appropriately high melting point or glass transition temperature, in particular for example of 217° C. according to ISO 11357. Polyetherimides are thus a high-temperature thermoplastic which can have a glass transition temperature well above the maximum curing temperature of epoxy resin (up to 180° C.).

However, the other materials in the group may also be used. For example, polyphenylsulphones (PPSU) may have a melting point or glass transition temperature according to ISO 11357 of 215° C. A glass transition temperature of polysulphones (PSU) may for example be 190° C. Further, energy release rates above the value for the pure epoxy resin are thus also achieved in the G1c test.

Further, a construction comprising further thermoplastic polymers is also possible, although lower energy release rates than for pure epoxy resin can also be achieved using the G1c test. Thus, for example, polyethersulphones, polyphenylenesulphones and/or polyamides may also be conceivable as a first thermoplastic polymer. These may also dissolve in the epoxy resin in such a way that an intermediate layer is formed. However, this intermediate layer may subsequently have a lower strength in some embodiments. They may therefore for example be used if a lower fracture toughness of the intermediate phase than of the epoxy resin is sufficient in an application. For example, use as a predetermined breaking point is conceivable, for example so as to protect the hard-to-repair fiber material of the composite material in the event of breakage.

In some embodiments, the first layer has a thickness in a range of more than 50 µm to less than or equal to 300 µm. In an advantageous embodiment, the first layer has a thickness in a range of from 100 µm to 150 µm. Layer thicknesses of this type form a sufficient reserve of material for the friction welding and the resulting friction weld flash, whilst the use of material and thus the weight of the connection element are simultaneously kept to a minimum.

In some embodiments, the composite component comprises a fiber-reinforced plastics material, in particular a carbon-fiber-reinforced plastics material. Alternatively or additionally, the composite component may also comprise a sandwich structure comprising a fiber-reinforced plastics material cover layer, in particular a carbon-fiber-reinforced plastics material cover layer. Advantageously, the connection element thus makes it possible to weld a further component to a fiber-reinforced plastics material or carbon-fiber-reinforced plastics material comprising epoxy resin matrix.

In some embodiments, a second layer is arranged on the first layer. The second layer comprises a second thermoplastic polymer which is not particularly limited, in particular a polyetheretherketone. Alternatively or additionally, polyethersulphones, polyphenylsulphones and/or polyamides may be comprised in the second layer. In a development, the second layer comprises or consists of a second thermoplastic polymer, in particular polyetheretherketone, polyethersulphone, polyphenylsulphone and/or polyamide. Advantageously, by the second layer, different additional or optimised properties of the connection element can be implemented. The second layer may for example be provided so as to improve the chemical stability of the connection element. This is advantageous in particular if the second thermoplastic polymer of the second layer does not itself dissolve in the epoxy resin. The first layer comprising the first thermoplastic polymer can thus act as an adhesion promoter between the epoxy resin and the second layer. Further, the second layer comprising the second thermoplastic polymer may also be provided to establish compatibility during welding and/or to improve welding properties. For example, this is advantageous in the event of component materials incompatible with the first layer. Further, for example, a desired viscosity of a melt or an adapted melting point can also be set in this way.

In an embodiment, the intermediate layer has a thickness in a range of from 20 µm to 100 µm. In particular, the thickness of the intermediate layer may be 30 µm to 80 µm. The thickness of the intermediate layer may in particular be dependent on the fraction of the time in the curing cycle for which there is a temperature of 100° C. or higher, in some embodiments at least 120° C., in particular at least 150° C. The longer the time, the more dissolution and diffusion can take place, and this tends to increase the thickness of the intermediate layer. A maximum layer thickness is achieved when the epoxy resin starts to gel, in such a way that there is no diffusion or a negligible amount.

Further, the intermediate layer optionally or additionally comprises a continuous concentration transition from the epoxy resin to the first thermoplastic polymer. This advantageously creates a gentle transition in the materials, in particular without jumps in rigidity. In this context, a continuous concentration transition should be understood to be a continuous decrease in the concentration of the epoxy resin from the composite component to the first layer within the intermediate layer, it being possible for this to be for example incremental or gradual or else of some other nature.

In some embodiments, the epoxy resin extends into the intermediate layer from the composite component towards the first layer in the form of a number of mutually adjacent volume portions. Alternatively or additionally, the volume portions may be interconnected, at least in part, in such a way that the individual volume portions are not isolated. In particular, the volume portions may be formed bubble-shape, for example as spherical structures. As a result of the adjacency or interconnected contact of the volume portions, they can cross-link and/or undercut thermoplastic polymer. In particular, the epoxy resin is therefore also mechanically engaged with thermoplastic polymer locally on a microscopic scale, in other words for example in the range of from 0.1 to 100 µm.

In some embodiments, the volume portions have a greater diameter (for example to be understood as the average intersection length through the volume portion) in a region of the intermediate layer adjacent to the composite component than in a region of the intermediate layer adjacent to the first layer. Alternatively or additionally, the volume portions may have a greater volume in a region of the intermediate layer adjacent to the composite component than in a region of the intermediate layer adjacent to the first layer. In the case of bubble-shaped volume portions, for example spheres, a larger diameter is usually accompanied by a greater volume. However, this is not necessarily the case, since at least some of the volume portions may also have shapes deviating from a bubble shape, in particular from a spherical shape. For example, at least some of the volume portions may also have tubularly extended and/or elliptical shapes. By the different sizes (diameters and/or volumes) of the volume portions, the distribution of which for example varies continuously over the thickness of the intermediate layer, a continuous concentration transition, for example as specified above, and thus a gentle and uniform transition of the materials, without jumps in rigidity or with small jumps in rigidity, are advantageously provided.

In some embodiments, the diameter of the volume portions in the region of the intermediate layer adjacent to the composite component is greater than 1 µm. In particular, the diameter of bubble-shaped volume portions, for example spheres, in the region of the intermediate layer adjacent to the composite component may be in a range of from 1 µm to 20 µm. Thus, in this region there is in particular a high concentration of epoxy resin. In particular, this concentration becomes lower continuously from the pure epoxy resin towards the first layer. In a region of the intermediate layer adjacent to the first layer, the diameter of the volume portions is less than 1 µm in some embodiments. In particular, the diameter here may be less, in particular much less, than 0.1 µm or 100 nm. Thus, in this region there is in particular a low concentration of epoxy resin, in particular continuously becoming lower into the pure first thermoplastic polymer.

In an embodiment of the method for producing a connection arrangement, the friction welding is implemented in the form of vibration friction welding. For example, this is circular vibration friction welding.

The above embodiments and developments can be combined in any desired manner, within reason. In particular, all features of the connection element are transferrable to the method for producing the connection element. Further, all features of the connection element are transferrable to the connection arrangement and to the method for producing the connection arrangement.

Further possible embodiments, developments and implementations of the disclosure herein also include combinations not explicitly mentioned of features of the disclosure herein which are described above or in the following in relation to the embodiments. In particular, a person skilled in the art will also add individual aspects to the relevant basic form of the present disclosure as improvements or additions.

In the following, the present disclosure is described in greater detail by way of embodiments with reference to the accompanying drawings. The elements of the drawings are not necessarily to scale.

BRIEF DESCRIPTION OF THE DRAWINGS

In the drawings.

In the drawings, unless otherwise specified, like reference numerals denote like or functionally equivalent components.

DETAILED DESCRIPTION

Figure 1:
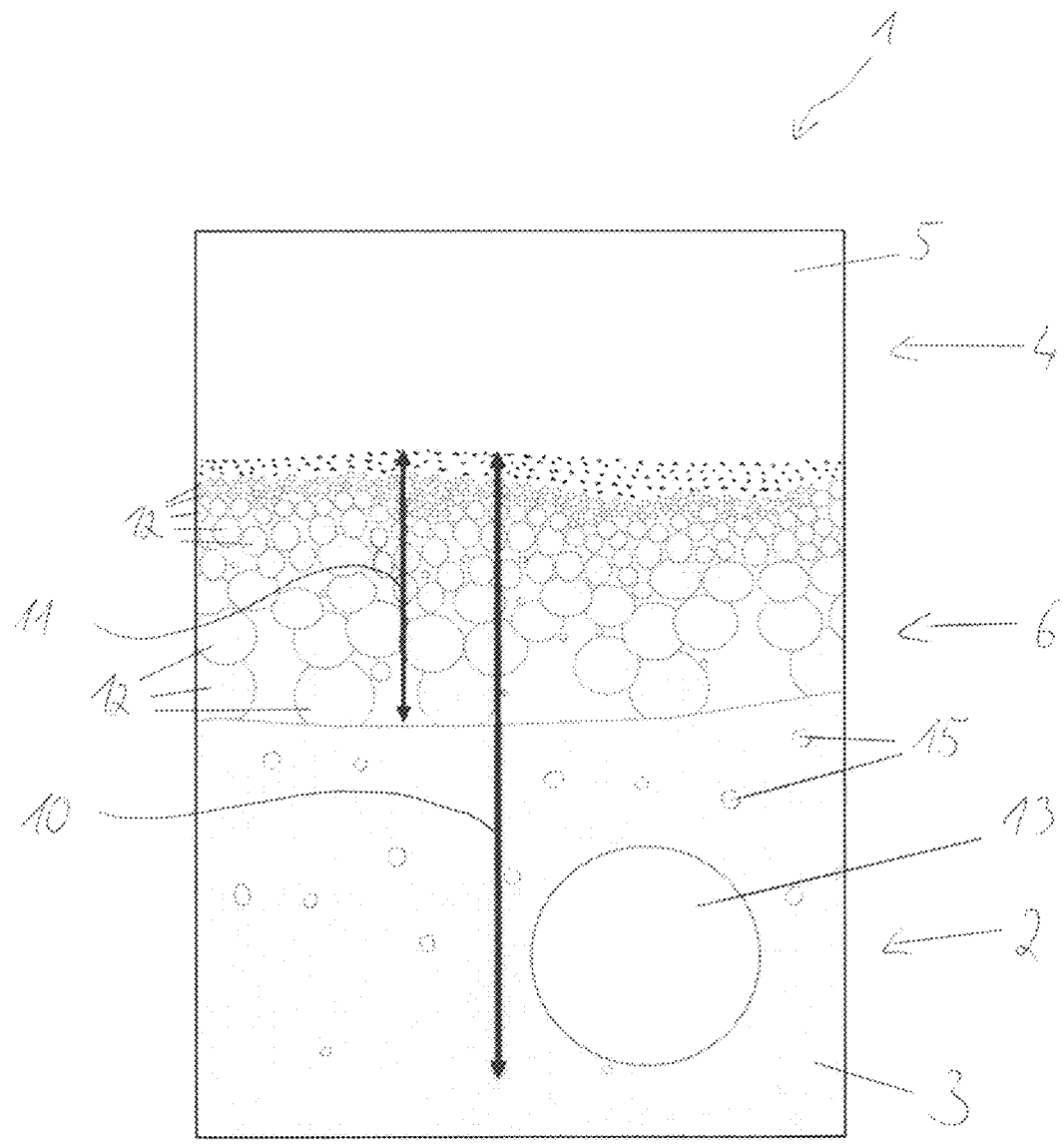
FIG. 1 is a schematic sketch of the structure of a connection of a composite component to a thermoplastic layer comprising the intermediate layer/mixing zone of thermoplastic and epoxy, after curing.

FIG. 1 is a schematic sketch of the structure of a connection of a composite component to a thermoplastic layer comprising the intermediate layer/mixing zone of thermoplastic and epoxy, after curing.

The connection element 1 comprises a composite component 2, a first layer 4 and an intermediate layer 6.

The composite component 2 comprises a cured epoxy resin 3 and a further material 13. The further material 13 may for example be carbon fibers. In this case, the composite component is a carbon-fiber-reinforced plastics material component.

The first layer 4 comprises a first thermoplastic polymer 5 having a melting point above the curing temperature of the epoxy resin 3. In particular, the first layer 4 contains a polyetherimide as the first thermoplastic polymer 5. Alternatively or additionally, the first layer may for example also contain polysulphone, polyphenylsulphone, polyhydroxyether and/or polycarbonate. In some embodiments, the first layer 4 comprises or consists at least predominantly of polyetherimide.

The intermediate layer 6 is arranged between the composite component 2 and the first layer 4. It contains both the cured epoxy resin 3 of the composite component 2 and the first thermoplastic polymer 5 of the first layer 4.

The intermediate layer 6 has a measurable thickness 11 and a continuous concentration transition from the epoxy resin 3 to the first thermoplastic polymer 5. This continuous concentration transition is implemented in that the epoxy resin 3 extends into the intermediate layer 6 from the composite component 2 towards the first layer 4 in the form of a number of mutually adjacent volume portions 12 which are interconnected in part. The volume portions 12 have a larger diameter and a larger volume in a region of the intermediate layer 6 adjacent to the composite component 2 than in a region of the intermediate layer 6 adjacent to the first layer 4.

Additionally, for example small bubbles 15 comprising thermoplastic material are provided diffused into the epoxy resin 3 of the composite component 2. This can result in a thickness 10 of the total concentration transition which is greater than the thickness of the intermediate layer 6 formed with the volume portions 12.

Figure 2A:
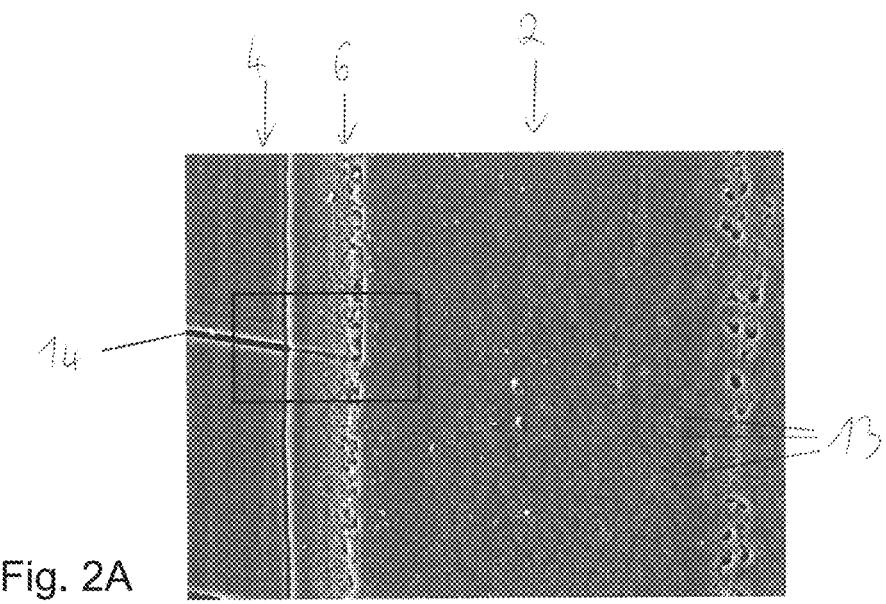
FIG. 2A is a scanning electron microscope image of an etched cross section polish of a mixing zone.

FIG. 2A shows a scanning electron microscope image of an etched cross section polish of an example connection element 1.

To produce the sample prepared in this manner, an appropriate sample was initially cut and polished. To etch the sample, a durable, fluff-free cloth was soaked with DCM (dichloromethane) and wiped over the polished sample once or twice. A tear 14 visible in the microscope image is a result of the etching (an artefact).

It can be seen here that the intermediate layer 6 is formed between the composite component 2 and the first layer 4.

It can further be seen that the composite component is passed through by a number of carbon fibers 13.

Figure 2B:
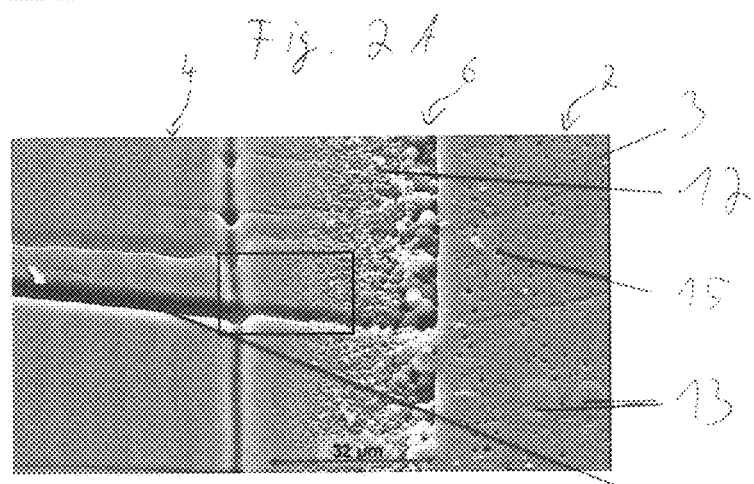
FIG. 2B is an enlarged view of the cross section polish of FIG. 2A in the region of the intermediate layer.

FIG. 2B is an enlarged view of the cross section polish of FIG. 2 in the region of the intermediate layer 6.

The distribution of the different-size bubble-shaped volume portions 12, having greater diameters in a region of the intermediate layer 6 adjacent to the composite component 2 and smaller diameters in a region of the intermediate layer 6 adjacent to the first layer 4, can clearly be seen here in the intermediate layer 6. The larger diameters are in a range between 1 μm and 20 μm, whilst the smaller diameters are below 1 μm.

Additionally, the small thermoplastic bubbles 15 diffused into the epoxy resin 3, which have a diameter in the micrometre range, and the carbon fibers 13 contained in the epoxy resin 3 are visible here.

Figure 2C:
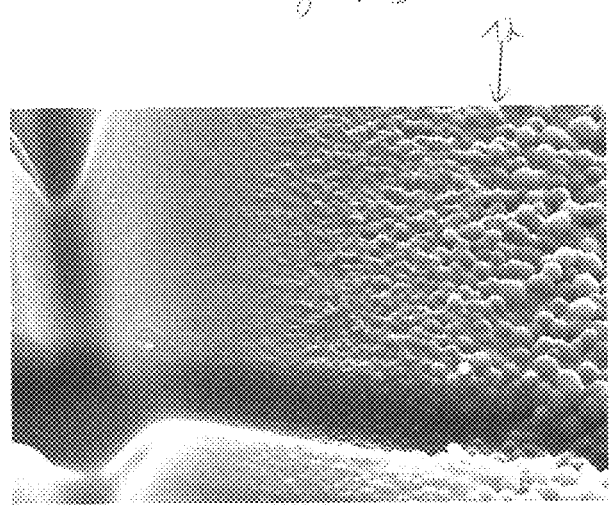
FIG. 2C is an additionally enlarged view of the cross section polish of FIG. 2B.

FIG. 2C is an additionally enlarged view of the cross section polish of FIG. 2. This enlarged view shows the phasing out of the intermediate layer 6 in a region adjacent to the first layer 4.

The volume portions 12 in the form of small bubbles are shown, and have a diameter less than 1 μm in the region shown at the right edge of the picture, which is approximately in the centre of the intermediate layer. In the centre of the detail shown, the diameters are already less than 0.1 μm or 100 nm. The size of the volume portions becomes continuously smaller and smaller until the first layer 4, and finally is formed small on the left half of the detail shown as far as the resolution limit of the scanning electron microscope. In particular, in a region not shown, the volume portions may become smaller as far as individual molecules of the epoxy resin.

Figure 3A:
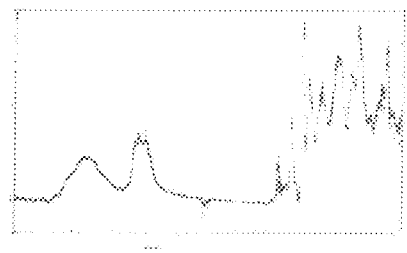
FIG. 3A is an FTIR spectrum of an example epoxy resin.

FIG. 3A shows an FTRI spectrum of an example epoxy resin. The spectrum is recorded using an FTIR microscope suitable for spectral analysis.

Here, the two relatively wide peaks of the spectrum (OH bands) shown on the left side of the graph are characteristic of the spectrum of the epoxy resin.

Figure 3B:
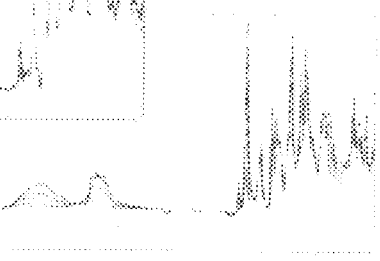
FIG. 3B is an FTIR spectrum of an example intermediate layer.
Figure 3C:
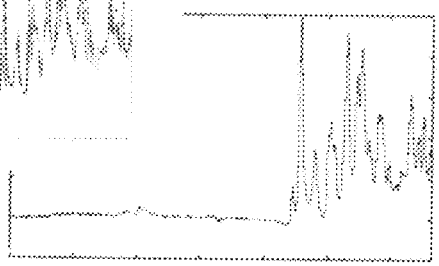
FIG. 3C is an FTIR spectrum of an example first thermoplastic polymer.

FIG. 3C shows an FTIR spectrum of an example first thermoplastic polymer. This spectrum has no peaks on the left side of the graph, but has three characteristic peaks on the right side (at approximately 1700 cm$^{-1}$).

FIG. 3B shows an FTIR spectrum of an example intermediate layer. The spectrum detected in this case has the two peaks as per the left side of the graph of FIG. 3A for the epoxy resin as well as the three peaks as per the right side of the of FIG. 3C for thermoplastic polymer. It is thus evident that both the epoxy resin and thermoplastic polymer are present in the intermediate layer.

In preliminary experiments, different thermoplastic polymers were evaluated in the first layer using a G1c test. This gave the following advantageous polymers: polyetherimide, polysulphone, polyphenylsulphone, polyhydroxyether and polycarbonate.

In the G1c test, the mode 1 energy release rate (G1c) or the energy required for tear propagation [J/m$^2$] is measured on a prepared sample, for example in accordance with ASTM D 5528-01 or DIN EN 6033. A percentage variation ΔG1c in the energy release rate for samples comprising different thermoplastic polymers in the first layer may for example be referenced to an unmodified CFRP material (0% variation).

As a result of the analysis, in exemplary embodiments the first thermoplastic polymer is selected from at least one of a group consisting of polyetherimide, polysulphone, polyphenylsulphone, polyhydroxyether and polycarbonate. For these materials, it can be seen from the G1c test that the energy release rate of the intermediate layer is increased by comparison with the unmodified CFRP.

Particularly, polyetherimide (PEI) may be used as the first thermoplastic polymer. On the one hand, the highest energy release rates are achieved therewith in the G1c test, indicating a high mechanical load-bearing capacity and quality of the connection of the composite component to the first layer by way of the intermediate layer. On the other hand, polyetherimide usually has a high melting point or glass transition temperature, for example in particular of 217° C. according to ISO 11357. Polyetherimides are thus a high-temperature thermoplastic which is soluble in the epoxy resin.

Aside from the stated group, a construction of the first layer comprising further thermoplastic polymers is also possible, although lower energy release rates as measurable by the G1c test are achieved. Thus for example polyethersulphone, polyphenylsulphone and/or polyamide are also conceivable as the first thermoplastic polymer.

Figure 4A:
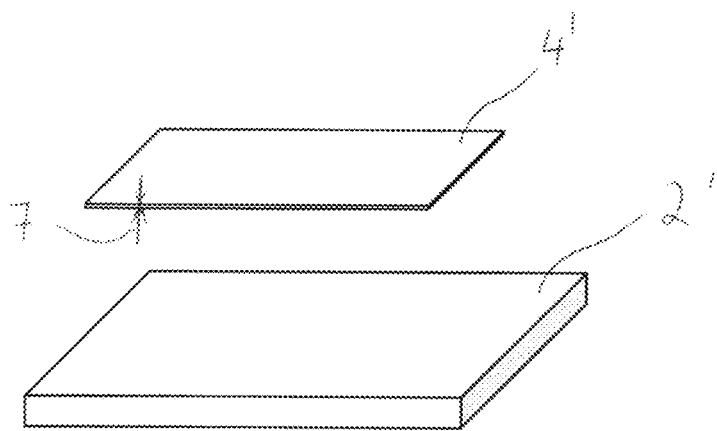
FIG. 4A is a schematic perspective view of a raw composite component and a first layer.

FIG. 4A is a schematic perspective view of a raw composite component 2' and a first 4'.

The first layer 4' is for example formed as a polyetherimide layer having a thickness 7 in a range of greater than 50 µm to less than or equal to 300 µm, in some embodiments in the range between 100 µm and 150 µm. In the state shown, the first layer 4' has not yet been applied to the raw composite component 2'.

The raw composite component 2' comprises for example a carbon fiber lattice and an uncured epoxy resin.

To produce the connection element 1, the first layer 4' is applied externally to the raw composite component 2'. Subsequently, the raw composite component 2' is cured at a temperature above 150° C. at least at times.

Figure 4B:
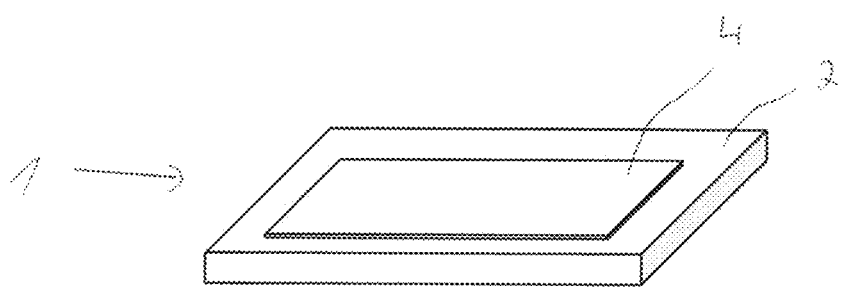
FIG. 4B is a schematic perspective view of an example connection element according to the disclosure herein, for example a thermoplastic/EP (epoxy resin) CFRP composite.

FIG. 4B is a schematic perspective view of a connection element 1.

In the curing process, the polyetherimide dissolves in the as yet uncured epoxy resin at high temperatures from 150° C. upwards. When the epoxy resin cures completely, the polyetherimide subsequently precipitates out again, resulting in the intermediate layer 6. The first layer 4 is thus firmly connected to the composite component 2 via the intermediate layer 6 after curing.

A weldable portion, which can be used for attachment to a further material or a further component, is created externally on the composite component 2 using the first layer 4.

Figure 5:
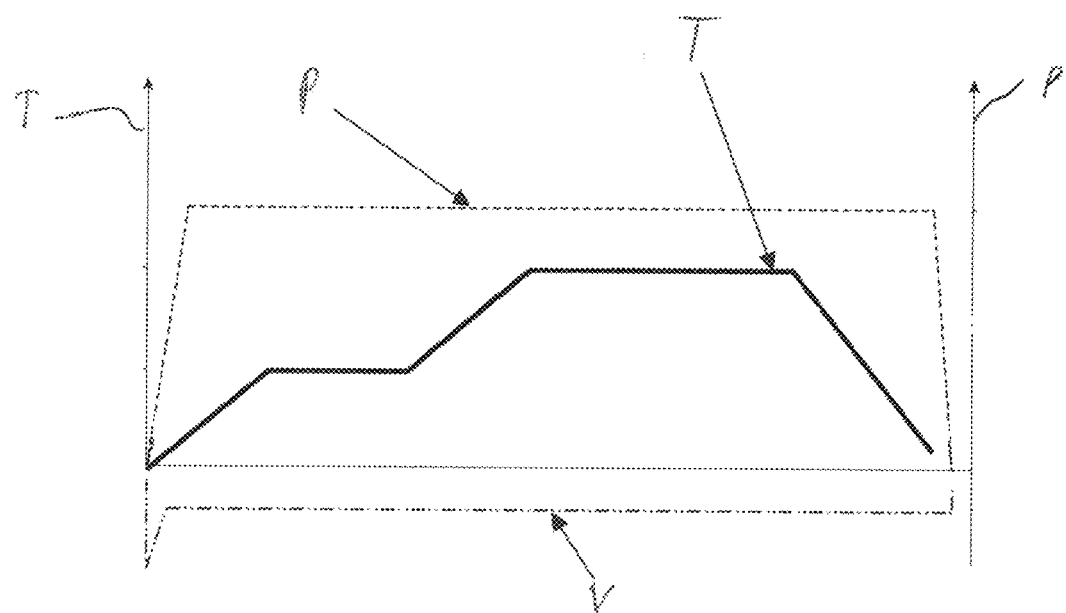
FIG. 5 shows an example pressure and temperature cycle for producing a connection element in an autoclave.

FIG. 5 shows an example pressure and temperature cycle for producing a connection element 1 in an autoclave. For other materials, autoclave-free processes (RTM, VAP etc.) are also possible.

This is a purely exemplary cycle, usually used for curing raw composite components containing a carbon fiber lattice and an epoxy resin, shown in a pressure-temperature diagram. Temperatures above 150° C. are sometimes operated in the autoclave. For different materials, other very difficult cycles may be required (autoclave, RTM, VAP etc.). The curing process is sometimes also adapted in a component-specific manner.

At the start of the cycle, a vacuum is initially generated in a component cavity sealed off from the interior of the autoclave. The progression of the vacuum is shown by the curve V in the diagram. Subsequently, in the autoclave, the pressure P, likewise shown with its own curve, is increased to an operating pressure, for example of 7 bar. Starting from a particular pressure P of for example 1 bar in the autoclave, the vacuum V of the component cavity is reduced, for example to 0.2 bar. In parallel with the increase in the pressure P in the autoclave, a temperature T, likewise represented by its own curve, is increased with a predetermined growth, for example 1 to 3° C. per minute, to a first temperature, for example approximately 110° C. The first temperature is maintained for a first duration, for example approximately 60 minutes. Subsequently, the temperature T is further increased at the increase rate of the predetermined growth to a second temperature, for example approximately 180° C. This second temperature is maintained for a second duration, for example approximately 120 minutes. Subsequently, the temperature T is continuously lowered at a predetermined decrease rate, for example at 2 to 5° C. per minute, to a third temperature, for example 60° C. To end the cycle, the pressure is released from the autoclave.

The temperature specifications on the cycle may for example be subject to a tolerance of ±5° C. The time specifications are for example subject to a tolerance of ±5 minutes.

Figure 6:
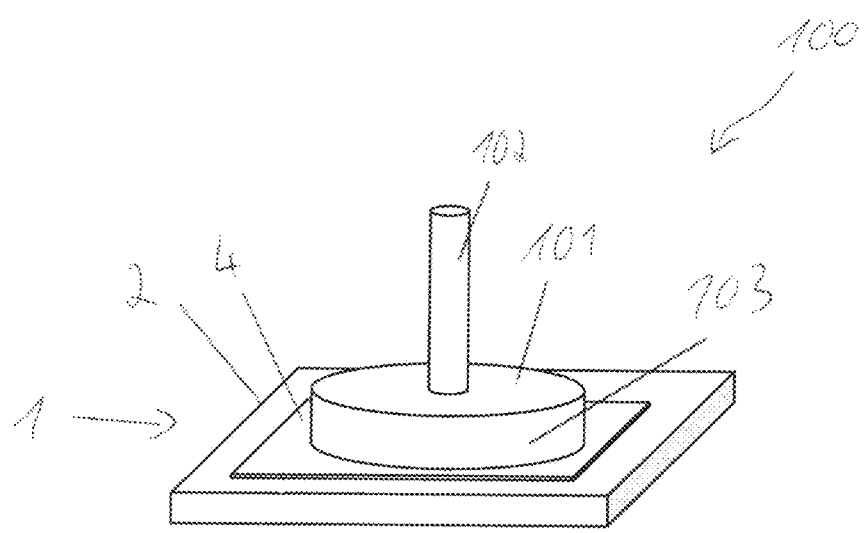
FIG. 6 is a perspective drawing of an example connection arrangement.

FIG. 6 is a perspective drawing of a connection arrangement 100.

The connection arrangement 100 contains the connection element 1 of FIG. 4B comprising the composite component 2 and the first layer 4 connected thereto via an intermediate layer 6 and containing a first thermoplastic polymer, for example polyetherimide.

Further, the connection arrangement 100 comprises a component 101 to be connected to the composite component 2. This may for example be a composite material attachment part. Other constructions of the component 101 are equally possible.

The component 101 has an attachment region 102 and a foot portion 103. The attachment region 102 comprises for example a screw thread and serves to connect the connection arrangement to another structure or component by screwing. Other constructions of the connection region 102 are also possible.

The foot portion 103 of the component 101 is welded to the first layer 4 of the connection element by friction welding. In a some embodiments, the method of circular vibration friction welding is used for the friction welding.

Figure 7:
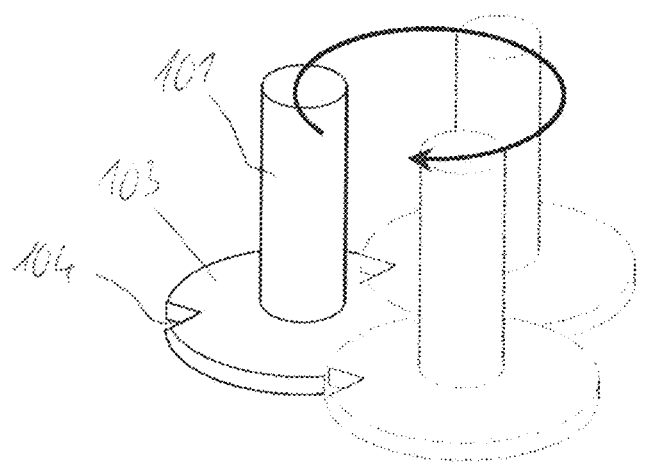
FIG. 7 is a schematic drawing of the movement sequence of a component during circular vibration friction welding.

FIG. 7 is a schematic drawing of the movement sequence of a component during circular vibration welding.

In circulator vibration friction welding, the supply of energy is introduced by a relative movement of the joining parts to be connected by a circular oscillation movement. This is illustrated here by the component 101 shown in dashed lines in different positions on a circular path and the circular arrow representing the circular movement.

During the circular oscillation movement, either only one of the parts to be welded or alternatively both parts to be welded may move. The parts do not rotate relative to one another, but merely move on a circular path. The circular vibration friction welding is commonly also known as orbital friction welding.

In the illustration shown, the component 101 moves along the circular oscillation movement without rotating, as can be seen from the position of the groove 104 on the left edge of the foot portion 103 of the component 101.

Advantageously, the limitations of conventional rotational friction welding, in which only approximately rotationally symmetrical components can be welded, are not present in circular vibration friction welding. Thus, unlike in rotational friction welding, the components do not have to be rotationally symmetrical in circular vibration friction welding, but may be of any desired shape.

As a further advantage over rotational friction, in which the relative speed of a point on the surface is dependent on the diameter of the component, there is no such dependency in circular vibration friction welding. Instead, the speed of a point is merely dependent on the circular path of the circular movement, all points of the faces to be welded moving at the same speed. Thus, particularly uniform introduction of energy is achieved.

Figure 8:
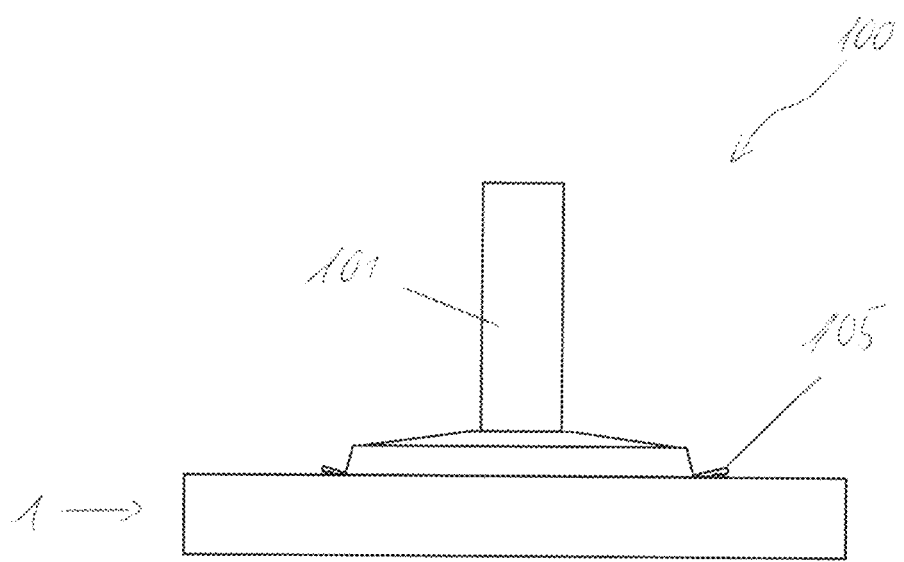
FIG. 8 is a schematic side view of an example connection arrangement.

FIG. 8 is a schematic side view of a connection arrangement 100.

The arrangement can be produced by welding the component 101 to the first layer 4 of the connection element 1 by circular vibration friction welding, in particular using a stationary circular welding system.

The friction welding of the connection arrangement 100 can be seen from the outside as a result of the friction weld flash 105 which typically occurs in circular vibration friction welding.

The friction weld flash 105 predominantly contains thermoplastic polymer material of the first layer 4 of the connection element 1. The formation of the friction weld flash 105 brings about the advantage that impurities are also expelled from the weld zone together with the friction weld flash. It is therefore not necessary to clean the surfaces of the first layer and the component to be connected in advance. As a further advantage, as a result of the friction weld flash 105, any bumps or curvatures in the surfaces to be welded of the first layer and the component to be connected are levelled or evened out, ensuring a continuous welded connection between the connection element 1 and the component 101.

The first layer 4 of the connection element 1 is therefore of a thickness 7 which makes possible the friction weld flash 105 required for the welding.

If the composite component 2 has a curvature, the surface of the first layer is also curved in a corresponding manner. In this case, the thickness of the first layer 4 has to be matched to the curvature so as to ensure complete welding of the foot portion 103 of the component 101 to the connection element 1.

Figure 9:
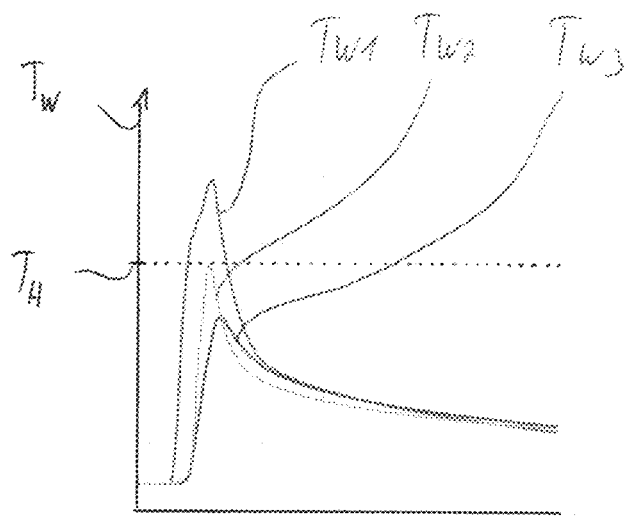
FIG. 9 shows a temperature progression over time during the circular friction welding of a component to the connection element.

FIG. 9 shows a temperature progression over time during the circular vibration friction welding of a component to the connection element.

Here, the temperature TW is plotted against time during the circular vibration friction welding for welding the component 101 at various locations within the connection element 1.

For this purpose, a component 101 formed as shown in FIGS. 6 to 8 was welded to a planar connection element 1 which has a first layer 4.

The curve TW 1 qualitatively shows a temperature progression in a region below the first layer 4 or in the region of the intermediate layer 6 at an edge region of the joining zone. Maximum temperatures of for example less than 250° C. are reached here. Above a curing temperature TH of the epoxy resin, the temperature progression only moves for a short period of a few seconds, which is for example less than 5 seconds including heating to the maximum and cooling.

The curve TW 2 shows the temperature progression in a region below the first layer 4 in the centre of the joining zone. In this case, there is a maximum temperature in the range of the curing temperature TH of the epoxy resin.

The curve TW 3 shows the temperature progression in the composite component 2 between a first and a second fiber layer of the fiber lattice of the composite component 2. Here, the temperature is always less than the curing temperature TH of the epoxy resin throughout the welding process.

Thus, in the region of the intermediate layer 6, a temperature above the curing temperature TH of the epoxy resin is only reached briefly at the edge of the joining zone and only briefly. Advantageously, as a result of the local introduction of heat, the welding process therefore takes place externally on the first layer 4 in a manner which keeps the temperature sufficiently low in the epoxy resin 3 of the composite component that this does not cause damage to or degradation of the epoxy resin.

Figure 10:
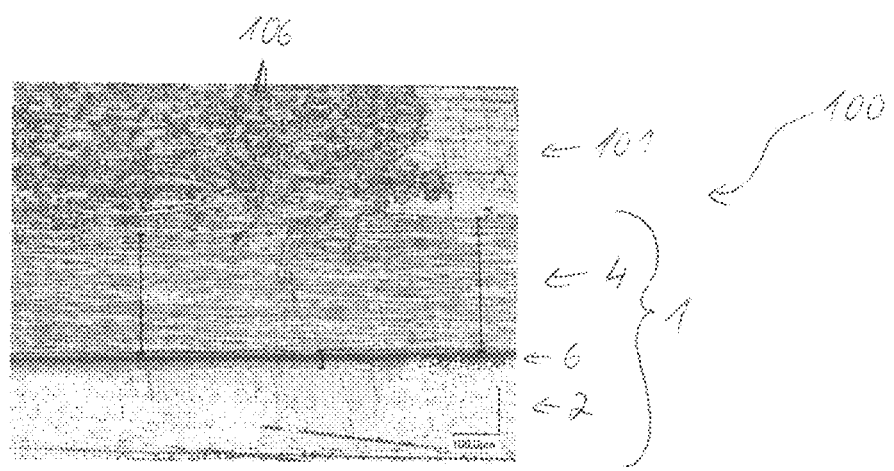
FIG. 10 is a light microscope image of an etched cross section polish of an example connection arrangement.

FIG. 10 is a light microscope image of an etched cross section polish of a connection arrangement 100.

Here the sample has been prepared in a manner as described with reference to FIG. 2A.

The connection arrangement 100 comprises the connection element 1 comprising the various portions of the composite component 2, the first layer 4 and the intermediate layer 6 formed in between.

The component 101, here formed by way of example as a glass-fiber-reinforced component, is welded to the first layer 4 externally and therefore in a material connection thereto. The glass fibers 106 can be seen individually in the image.

Figure 11:
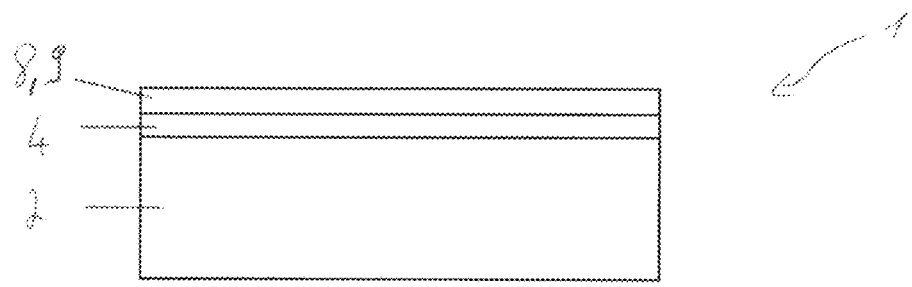
FIG. 11 is a schematic drawing of an example connection element comprising a first and a second layer.

FIG. 11 is a schematic drawing of a connection element 1 comprising a first layer 4 and a second layer 8.

Here, in addition to the composite component 2 and the first layer 4, the connection element 1 comprises a second layer 8 materially connected to the first layer 4. This contains a second thermoplastic polymer 9 different from the first thermoplastic polymer 5. By the second thermoplastic polymer 9 or the second layer 8, the surface properties of the connection element 1 can be influenced.

For example, the second layer may contain polyetheretherketone as a second thermoplastic polymer. Alternatively or additionally, polyethersulphone, polyamide and/or polyphenylsulphone may for example also be contained in the second layer 8. Alternatively or additionally, further thermoplastic polymers may be comprised by the second layer.

The second layer 8 may be formed for example so as to improve the chemical stability of the connection element. Further, the second layer 8 may also be formed so as to establish compatibility for welding a component of which the material is not compatible with the first thermoplastic polymer 5 or is less suitable for welding by comparison with the second thermoplastic polymer 9.

Providing the second layer 8 is advantageous in particular if the properties thereof are desired, but the second thermoplastic polymer 9 of the second layer 8 does not itself dissolve in the epoxy resin 3 of the composite component 2. The first layer 4 comprising the first thermoplastic polymer 5 thus acts as an adhesion promoter between the epoxy resin 3 and the second layer 8.

Further, the welding properties of the connection element 1 may also be influenced using the second layer 8. For example, the second layer 8 may contain a thermoplastic polymer 9 which has a lower-viscosity melt and/or a lower melting point than the first thermoplastic polymer 5, in such a way that a component 101 can be welded to the connection element 1 in a simpler manner. Further, in particular, in this way two connection elements 1, each formed using one of the composite components, can be welded together in a simpler manner to connect two composite components.

For example, the first layer contains polyetherimide and has a thickness of 100 µm, whilst the second layer contains polyetheretherketone and has a thickness of 125 µm. The first layer thus provides attachment to the epoxy resin 3 of the composite component 2, the second layer acting as an outer functional layer.

Figure 12A:
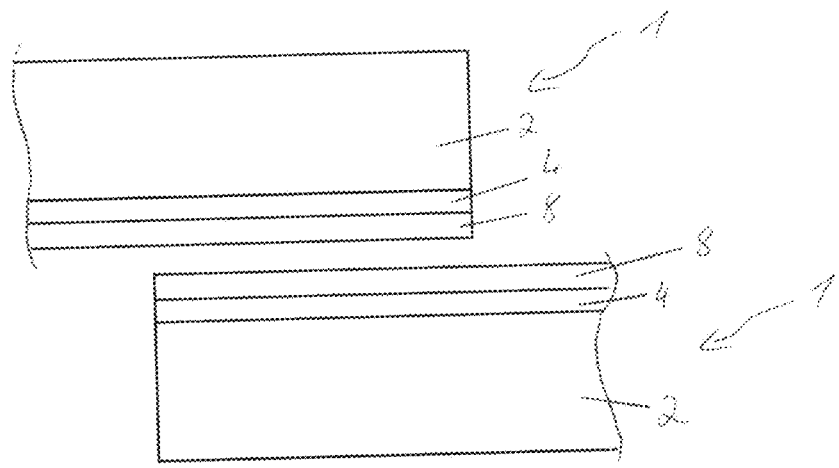
FIG. 12A is a schematic view of two connection elements according to FIG. 11 to be connected.

FIG. 12A is a schematic view of two connection elements according to FIG. 13 to be interconnected.

Two connection elements 1 can be welded together well by way of the respective second layer 8, which here by way of example has better welding properties than the first layer 4.

For welding the two connection elements 1, they are for example positioned with the respective second layers 8 thereof on top of one another in an overlap region. By friction welding, for example circular vibration friction welding, the two second layers 8 are subsequently interconnected over the entire area to form a shared second layer 8'.

Figure 12B:
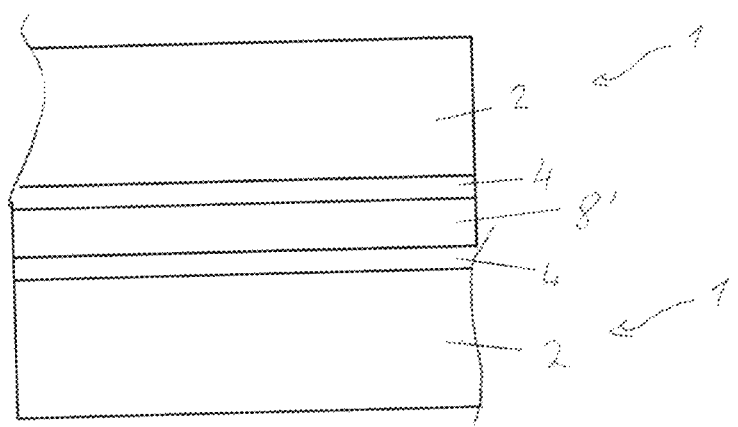
FIG. 12B shows the connection elements of FIG. 12A when connected.

FIG. 12B shows the connection elements of FIG. 12A in a connected state.

The shared second layer 8' extends continuously over the overlap region of the two connection elements 1. Thus, a reliable connection between the two connection elements 1 is provided in a very simple manner. In particular, in this way the two composite components 2 containing epoxy resin are connected at a high strength in a simple manner by a reliable process.

Although the present disclosure has been described herein by way of exemplary embodiments, it is not limited thereto, but can be modified in various ways.

For example, further thermoplastic polymers beyond those mentioned in the embodiments or different configurations of the mentioned thermoplastic polymers as materials for the first or second layer are conceivable. Further, different epoxy resins from the epoxy resin mentioned in the embodiment are also conceivable for the composite component.

The composite component need not necessarily be a carbon-fiber-reinforced component. It may equally be a glass-fiber-reinforced component or a different type of composite component comprising an epoxy resin component. Further, it may also be a sandwich structure, at least a cover layer of the sandwich structure including the epoxy resin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection element comprising:
a composite component comprising a cured epoxy resin;
a first layer comprising a first thermoplastic polymer;
an intermediate layer arranged between the composite component and the first layer and containing both the epoxy resin of the composite component and the first thermoplastic polymer of the first layer;
wherein the first thermoplastic polymer has a melting point, in particular a glass transition temperature, above a curing temperature of the epoxy resin;
wherein the first thermoplastic polymer is soluble at a temperature of at least 150° C. in the epoxy resin used for producing the composite component;
wherein the curing temperature of the epoxy resin is up to 180° C.;
wherein the glass transition temperature of the first thermoplastic polymer is higher than 185° C., in particular higher than 200° C.; and
wherein the epoxy resin extends into the intermediate layer, from the composite component towards the first layer, in a form of a number of volume portions which are mutually adjacent or interconnected at least in part, wherein the volume portions are configured as bubbles and have, in a region of the intermediate layer that is adjacent to the composite component, a diameter or a volume that is greater than in a region of the intermediate layer that is adjacent to the first layer.

2. The connection element of claim 1, wherein the first layer is provided externally on the composite component.

3. The connection element of claim 1, wherein the first layer consists of the first thermoplastic polymer.

4. The connection element of claim 1, wherein the first thermoplastic polymer is selected from at least one of a group consisting of polyetherimide, polysulphone, polyphenylsulphone, polyhydroxyether, and polycarbonate.

5. The connection element of claim 1, wherein the first layer has a thickness in a range of greater than 50 micrometers (μm) to less than or equal to 300 μm.

6. The connection element of claim 5, wherein the thickness of the first layer is in a range of from 100 μm to 150 μm.

7. The connection element of claim 1, wherein the composite component comprises a fiber-reinforced plastics material.

8. The connection element of claim 7, wherein the fiber-reinforced plastics material is configured as a carbon-fiber-reinforced plastics material.

9. The connection element of claim 1, wherein the composite component comprises a sandwich structure comprising a fiber-reinforced plastics material cover layer.

10. The connection element of claim 9, wherein the fiber-reinforced plastics material cover layer is a carbon-fiber-reinforced plastics material cover layer.

11. The connection element of claim 1, comprising a second layer having a second thermoplastic polymer arranged on the first layer.

12. The connection element of claim 11, wherein the second thermoplastic polymer is selected from at least one of a group consisting of polyetheretherketone, polyethersulphone, polyamide, and polyphenylsulphone.

13. The connection element of claim 1, wherein the intermediate layer has a thickness in a range of from 20 micrometers (μm) to 100 μm or from 30 μm to 80 μm.

14. The connection element of claim 13, wherein the thickness of the intermediate layer has a is in a range of from 30 μm to 80 μm.

15. The connection element of claim 1, wherein the intermediate layer comprises a continuous concentration transition from the epoxy resin to the first thermoplastic polymer.

16. The connection element of claim 1., wherein the diameter of the volume portions in the region of the intermediate layer that is adjacent to the composite component is greater than 1 micrometer (μm) and is less than 1 μm in the region of the intermediate layer that is adjacent to the first layer.

17. The connection element of claim 16, wherein the diameter of the volume portions in the region of the intermediate layer that is adjacent to the composite component is in a range of from 1 μm to 20 μm.

18. The connection element of claim 16, wherein the diameter of the volume portions in the region of the intermediate layer that is adjacent to the first layer is less than 0.1 μm.

19. A connection arrangement comprising:
a connection element comprising:
- a composite component comprising a cured epoxy resin;
- a first layer comprising a first thermoplastic polymer; and
- an intermediate layer arranged between the composite component and the first layer and containing both the epoxy resin of the composite component and the first thermoplastic polymer of the first layer;
- wherein the first thermoplastic polymer has a melting point, in particular a glass transition temperature, above a curing temperature of the epoxy resin;
- wherein the first thermoplastic polymer is soluble at a temperature of at least 150° C. in the epoxy resin used for producing the composite component;
- wherein the curing temperature of the epoxy resin is up to 180° C.;
- wherein the glass transition temperature of the first thermoplastic polymer is higher than 18° C., in particular higher than 200° C.; and
- wherein the epoxy resin extends into the intermediate layer, from the composite component towards the first layer, in a form of a number of volume portions which are mutually adjacent or interconnected at least in part, wherein the volume portions are configured as bubbles and have, in a region of the intermediate layer that is adjacent to the composite component, a diameter or a volume that is greater than in a region of the intermediate layer that is adjacent to the first layer; and
a component connected to the connection element, wherein the component is welded to the first layer of the connection element.

20. The connection arrangement of claim 19, wherein the component is welded to the first layer of the connection element by friction welding.

21. The connection arrangement of claim 20, wherein the component is welded to the first layer of the connection element by circular vibration friction welding.

22. A connection arrangement comprising:
a connection element comprising:
- a composite component comprising a cured epoxy resin:
- a first layer comprising a first thermoplastic polymer:
- an intermediate layer arranged between the composite component and the first layer and containing both the epoxy resin of the composite component and the first thermoplastic polymer of the first layer and
- a second layer comprising a second thermoplastic polymer arranged on the first layer;
- wherein the first thermoplastic polymer has a melting point, in particular a glass transition temperature, above a curing temperature of the epoxy resin,
- wherein the first thermoplastic polymer is soluble at a temperature of at least 150° C. in the epoxy resin used for producing the composite component;
- wherein the curing temperature of the epoxy resin is up to 180° C.;
- wherein the glass transition temperature of the first thermoplastic polymer is higher than 185° C., in particular higher than 200° C.; and
- wherein the epoxy resin extends into the intermediate layer, from the composite component towards the first layer, in a form of a number of volume portions which are mutually adjacent or interconnected at least in part, wherein the volume portions are configured as bubbles and have, in a region of the intermediate layer that is adjacent to the composite component, a diameter or a volume that is greater than in a region of the intermediate layer that is adjacent to the first layer; and
a component connected to the connection element, wherein the component is welded to the second layer of the connection element.

23. The connection arrangement of claim 22, wherein the component is welded to the second layer of the connection element by friction welding.

24. The connection arrangement of claim 23, wherein the component is welded to the second layer of the connection element by circular vibration friction welding.

25. A method for manufacturing a connection element, the method comprising:
- providing a raw composite component comprising at least one uncured epoxy resin;
- applying a first layer comprising a first thermoplastic polymer to the raw composite component, the first thermoplastic polymer having a melting point, in particular a glass transition temperature, above a curing temperature of the epoxy resin; and
- curing the raw composite component at a temperature of at least 150° C., the first thermoplastic polymer dissolving at a temperature of at least 150° C. in the at least one uncured epoxy resin,
- wherein the curing temperature of the epoxy resin is up to 180° C., and
- wherein the glass transition temperature of the first thermoplastic polymer is higher than 185° C., in particular higher than 200° C.

26. A method for producing a connection arrangement, the method comprising:
providing a connection element comprising:
- a composite component comprising a cured epoxy resin:
- a first layer comprising a first thermoplastic polymer:
- an intermediate layer arranged between the composite component and the first layer and containing both the epoxy resin of the composite component and the first thermoplastic polymer of the first layer
- wherein the first thermoplastic polymer has a melting point, in particular a glass transition temperature, above a curing temperature of the epoxy resin;
- wherein the first thermoplastic polymer is soluble at a temperature of at least 150° C. in the epoxy resin used for producing the composite component;
- wherein the curing temperature of the epoxy resin is up to 180° C., and
- wherein the glass transition temperature of the first thermoplastic polymer is higher than 185° C., in particular higher than 200° C. and
welding a component, which is configured to be connected to the connection element, to the first layer of the connection element by friction welding.

27. The method of claim 26, wherein the friction welding is implemented in a form of vibration friction welding.

28. The method of claim 27, wherein the vibration friction welding is implemented in a form of circular vibration friction welding.

29. A method for producing a connection arrangement, the method comprising:
providing a connection element comprising:
- a composite component comprising a cured epoxy resin;

a first layer comprising a first thermoplastic polymer;
an intermediate layer arranged between the composite component and the first layer and containing both the epoxy resin of the composite component and the first thermoplastic polymer of the first layer; and
a second layer comprising a second thermoplastic polymer arranged on the first layer;
wherein the first thermoplastic polymer has a melting point, in particular glass transition temperature, above a curing temperature of the epoxy resin;
wherein the first thermoplastic polymer is soluble at a temperature of at least 150° C. in the epoxy resin used for producing the composite component;
wherein the curing temperature of the epoxy resin is up to 180° C.; and
wherein the glass transition temperature of the first thermoplastic polymer is higher than 185° C., in particular higher than 200° C.; and
welding a component, which is configured to be connected to the connection element, to the second layer of the connection element by friction welding.

30. The method of claim 29, wherein the friction welding is implemented in a form of vibration friction welding.

31. The method of claim 30, wherein the vibration friction welding is implemented in a form of circular vibration friction welding.

32. A method for producing a connection arrangement comprising:

providing a connection element produced by a method comprising:
providing a raw composite component comprising at least one uncured epoxy resin;
applying a first layer comprising a first thermoplastic polymer to the raw composite component, the first thermoplastic polymer having a melting point, in particular glass transition temperature, above a curing temperature of the epoxy resin; and
curing the raw composite component at a temperature of at least 150° C., the first thermoplastic polymer dissolving at a temperature of at least 150° C. in the at least one uncured epoxy resin;
wherein the curing temperature of the epoxy resin is up to 180° C.; and
wherein the glass transition temperature of the first thermoplastic polymer is higher than 185° C., in particular higher than 200° C.; and
welding a component, which is configured to be connected to the connection element, to the first layer of the connection element by friction welding.

33. The method of claim 32, wherein the friction welding is implemented in a form of vibration friction welding.

34. The method of claim 33, wherein the vibration friction welding is implemented in a form of circular vibration friction welding.

* * * * *